(12) United States Patent
Couture et al.

(10) Patent No.: US 10,801,331 B2
(45) Date of Patent: Oct. 13, 2020

(54) GAS TURBINE ENGINE ROTOR INCLUDING SQUEALER TIP POCKET

(71) Applicant: United Technologies Corporation, Farmington, CT (US)

(72) Inventors: Patrick D. Couture, Tolland, CT (US); Scott D. Lewis, Vernon, CT (US); Kyle C. Lana, Portland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 564 days.

(21) Appl. No.: 15/175,108

(22) Filed: Jun. 7, 2016

(65) Prior Publication Data

US 2017/0350255 A1    Dec. 7, 2017

(51) Int. Cl.
*F01D 5/18* (2006.01)
*F01D 5/20* (2006.01)
*F02C 3/04* (2006.01)

(52) U.S. Cl.
CPC ........... *F01D 5/18* (2013.01); *F01D 5/186* (2013.01); *F01D 5/187* (2013.01); *F01D 5/20* (2013.01); *F02C 3/04* (2013.01); *F05D 2220/32* (2013.01); *F05D 2230/21* (2013.01); *F05D 2240/303* (2013.01); *F05D 2240/304* (2013.01); *F05D 2240/307* (2013.01); *F05D 2250/711* (2013.01); *F05D 2250/712* (2013.01); *F05D 2260/202* (2013.01)

(58) Field of Classification Search
CPC ... F01D 5/147; F01D 5/20; F01D 5/18; F01D 5/186; F01D 5/187; F01D 11/12; F01D 11/08; F05D 2240/307; F05D 2260/202
See application file for complete search history.

(56) References Cited

U.S. PATENT DOCUMENTS

| 3,018,542 | A | * | 1/1962 | Clarke | B21D 53/78 29/889.72 |
|---|---|---|---|---|---|
| 4,589,823 | A | | 5/1986 | Koffel | |
| 5,503,527 | A | | 4/1996 | Lee et al. | |
| 6,179,556 | B1 | | 1/2001 | Bunker | |
| 6,190,129 | B1 | * | 2/2001 | Mayer | F01D 5/187 416/235 |

(Continued)

FOREIGN PATENT DOCUMENTS

CN    205135721    4/2016

OTHER PUBLICATIONS

European Search Report for Application No. 17174721.5 dated Nov. 7, 2017.

*Primary Examiner* — Todd E Manahan
*Assistant Examiner* — Thuyhang N Nguyen
(74) *Attorney, Agent, or Firm* — Carlson, Gaskey & Olds, P.C.

(57) ABSTRACT

A gas turbine engine blade includes a blade portion having a leading edge and a trailing edge. A first surface connects the leading edge to the trailing edge and a second surface connects the leading edge to the trailing edge. A tip section is located at a first end of the blade portion and includes a pocket protruding into the tip section from an outermost end of the tip section. The pocket has a first side wall adjacent the first surface and a second side wall adjacent the second surface. At least one of the first side wall and the second side wall have a curve distinct from a curve of the corresponding adjacent surface.

15 Claims, 3 Drawing Sheets

(56) References Cited

U.S. PATENT DOCUMENTS

| | | |
|---|---|---|
| 6,602,052 B2 | 8/2003 | Liang |
| 6,824,359 B2 | 11/2004 | Chlus et al. |
| 6,991,430 B2 | 1/2006 | Stec et al. |
| 7,276,170 B2 | 10/2007 | Oakley et al. |
| 7,513,743 B2 * | 4/2009 | Liang ..................... F01D 5/20 415/173.6 |
| 7,726,944 B2 | 6/2010 | Page et al. |
| 8,186,965 B2 * | 5/2012 | Kuhne ..................... F01D 5/20 415/173.1 |
| 8,313,287 B2 | 11/2012 | Little |
| 8,845,280 B2 | 9/2014 | Diamond et al. |
| 9,228,442 B2 | 1/2016 | Mongillo, Jr. et al. |
| 2003/0021684 A1 * | 1/2003 | Downs ................... F01D 5/145 416/92 |
| 2012/0051934 A1 * | 3/2012 | Allen ..................... C25D 7/10 416/229 R |
| 2013/0302162 A1 * | 11/2013 | Nash ..................... F01D 5/20 416/1 |
| 2014/0030102 A1 | 1/2014 | Mishra et al. |
| 2015/0330228 A1 | 11/2015 | Quach et al. |

\* cited by examiner

GAS TURBINE ENGINE ROTOR INCLUDING SQUEALER TIP POCKET

TECHNICAL FIELD

The present disclosure relates generally to gas turbine engine rotors, and more specifically to a gas turbine engine rotor including a squealer tip pocket.

BACKGROUND

Gas turbine engines, such as those used on commercial aircraft, utilize a compressor to compress air, a combustor to mix the compressed air with a fuel and ignite the mixture, and a turbine across which the resultant combustion products are expanded. Expansion of the combustion products drives the turbine section to rotate, which in turn drives rotation of a shaft connecting the compressor to the turbine.

Included within each of the turbine sections are multiple rotor blades arranged circumferentially about an axis defined by the engine, and protruding radially outward from an inner diameter of the engine flowpath. Each rotor blade is designed to facilitate driving rotation of the turbine shaft. The efficiency by which the expansion of combustion products is converted to rotation within the turbine is partially related to a radially outward tip clearance between a tip of each rotor and an outer diameter of the flowpath.

SUMMARY OF THE INVENTION

In one exemplary embodiment a gas turbine engine blade includes a blade portion including a leading edge, a trailing edge, a first surface connecting the leading edge to the trailing edge and a second surface connecting the leading edge to the trailing edge, a tip section at a first end of the blade portion, the tip including a pocket protruding into the tip section from an outermost end of the tip section, and the pocket having a first side wall adjacent the first surface and a second side wall adjacent the second surface, at least one of the first side wall and the second side wall having a curve distinct from a curve of the corresponding adjacent surface.

In another exemplary embodiment of the above described gas turbine engine blade the first surface is concave and the second surface is convex.

In another exemplary embodiment of any of the above described gas turbine engine blades the first surface at the tip portion is convex and the second surface at the tip portion is convex.

Another exemplary embodiment of any of the above described gas turbine engine blades further includes a coating at least covering the tip section, the first side wall and the second side wall.

Another exemplary embodiment of any of the above described gas turbine engine blades further includes a plurality of rod holes connecting at least one internal cooling passage of the engine blade with the outermost end of the tip section.

In another exemplary embodiment of any of the above described gas turbine engine blades the pocket includes a forward portion, a mid portion and an aft portion, at least one of the forward portion and the aft portion including sidewalls having a curve aligned with the corresponding adjacent surface.

In another exemplary embodiment of any of the above described gas turbine engine blades the forward portion and the aft portion include sidewalls having a curve aligned with the corresponding adjacent surface.

In another exemplary embodiment of any of the above described gas turbine engine blades a thickness between one of the first surface and the second surface and a corresponding squealer pocket side wall at the mid section is greater than a thickness of the one between the one of the first surface and the second surface and the corresponding squealer pocket side wall at the forward portion.

In another exemplary embodiment of any of the above described gas turbine engine blades a thickness between one of the first surface and the second surface and a corresponding squealer pocket side wall at the mid section is greater than a thickness between the one of the first surface and the second surface and the corresponding squealer pocket side wall at the aft portion.

In another exemplary embodiment of any of the above described gas turbine engine blades a thickness between one of the first surface and the second surface and a corresponding squealer pocket side wall at the mid section is greater than a thickness of the one between the one of the first surface and the second surface and the corresponding squealer pocket side wall at the forward portion.

In another exemplary embodiment of any of the above described gas turbine engine blades the blade portion, tip section and pocket are a singular cast component.

In another exemplary embodiment of any of the above described gas turbine engine blades a first side and a second side of the pocket is concave.

In another exemplary embodiment of any of the above described gas turbine engine blades the tip section further includes a tip shelf extending along one of the first surface and the second surface.

In another exemplary embodiment of any of the above described gas turbine engine blades the tip shelf is a radial inward intrusion into the tip section, and wherein the tip shelf extends from a trailing edge to a position forward of the pocket and aft of the leading edge.

An exemplary method for creating a gas turbine engine blade includes casting a blade portion having a tip section at a first end of the blade portion, the tip including a pocket protruding into the tip section from an outermost end of the tip section, and the pocket having a first side wall adjacent a first exterior surface of the tip section and a second side wall adjacent a second exterior surface of the tip section, at least one of the first side wall and the second side wall having a curve distinct from a curve of the corresponding adjacent surface.

In another example of the above described exemplary method for creating a gas turbine engine blade the casting process is an investment casting process and includes casting at least one purge hole in the outermost end of the tip section.

Another example of any of the above described exemplary methods for creating a gas turbine engine further includes coating at least the tip section of the blade portion with a cutting coating, such that the tip section is abrasive relative to a corresponding blade outer air seal, and wherein the cutting coating is further applied to each of the first side wall and the second side wall of the pocket.

In another example of any of the above described exemplary methods for creating a gas turbine engine the casting creates a convex first surface and a concave second surface.

In another example of any of the above described exemplary methods for creating a gas turbine engine the casting creates a convex first surface and a convex second surface.

These and other features of the present invention can be best understood from the following specification and drawings, the following of which is a brief description.

DETAILED DESCRIPTION OF AN EMBODIMENT

Figure 1:
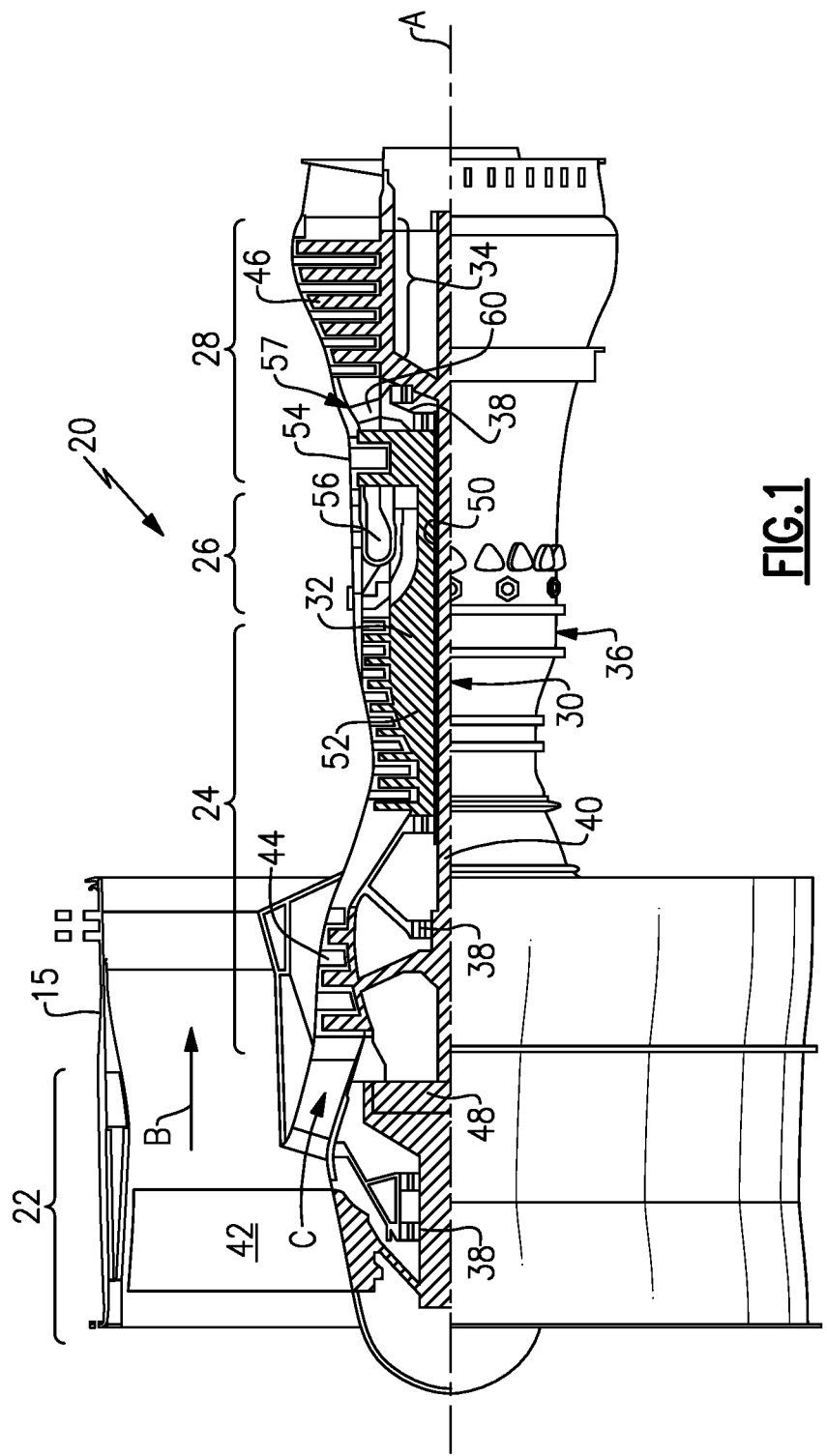
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10668 meters). The flight condition of 0.8 Mach and 35,000 ft (10668 m), with the engine at its best fuel consumption—also known as "bucket cruise Thrust Specific Fuel Consumption ('TSFCT')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/s).

Within the turbine section are multiple turbine rotors, with each rotor having multiple rotor blades arranged circumferentially in a ring and protruding radially outward from an inner diameter of the turbine section flowpath. Each rotor is paired with a corresponding stator section to form a turbine stage. Each rotor blade spans a majority of the primary flowpath.

In order to prevent thermal mechanical fatigue (TMF) based cracking in the tip of the rotor blade, the amount of material in the tip of the blade is minimized as much as possible. The minimization of material is achieved, at least in part, by the creation of a squealer pocket that protrudes into the tip of the rotor blade. Creation of the squealer pocket, however, reduces the cutting ability of the blade tip when the blade tip contacts an outer diameter of the flowpath. This, in turn, increases the gap between the blade and the outer diameter of the flowpath radially outward of the blade, thereby reducing the efficiency of the engine.

Figure 2:
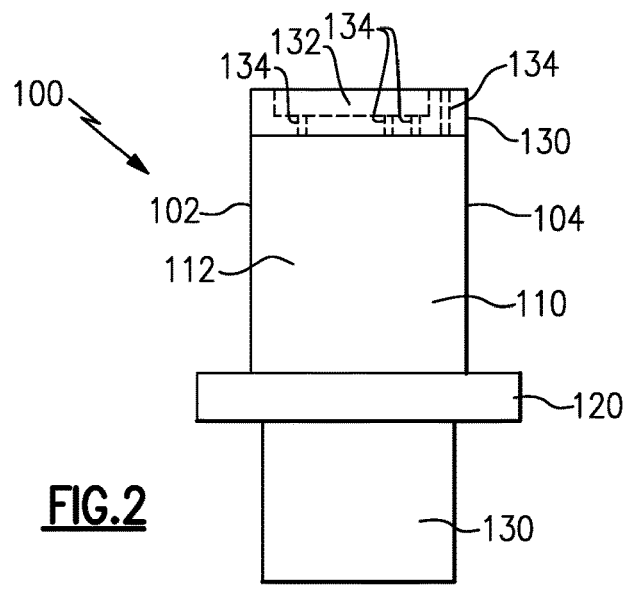
FIG. 2 schematically illustrates an exemplary rotor blade for utilization within a gas turbine engine.

With continued reference to FIG. 1, FIG. 2 schematically illustrates an exemplary rotor blade 100, such as could be used in an exemplary turbine engine stage. The rotor blade 100 includes a blade portion 110 protruding radially outward from a platform 120. A root portion 130 protrudes radially inward from the platform 120, and operates to secure the rotor blade 100 in position within the turbine stage. The blade portion 110 includes a radially outward tip portion 130. The blade portion 110 defines a leading edge 102 and a trailing edge 104. The leading edge 102 and the trailing edge 104 are connected by a suction surface (hidden) and a pressure surface 112. The suction surface and the pressure surface 112 define an airfoil shaped cross section, with the specific curvature of the airfoil shape being configured to impart desired flow characteristics on the combustion products passing through the turbine section.

The tip section 130, alternately referred to as a squealer tip, includes a squealer pocket 132. The squealer pocket 132 is a radially inward protrusion into the tip section 130 and defines a void where no tip material is present. In some examples, such as the illustrated example, the rotor blade 100 is a cast component and is created using an investment casting technique. In such examples, the core is a physical structure defining a positive geometry that is the same as internal voids within the end product. By using an investment casting core, cooling cavities can be formed within the rotor blade 100. The cooling cavities are connected to the tip portion 130 via one or more purge holes 134. The purge holes 134 are alternately referred to as rod holes, because the investment casting core used to create the cast blade includes stabilizing rods that form the purge holes 134. During operation of a blade cooling system including the purge holes 134, cooling air is purged from within the rotor blade 100 out the tip portion 134 into the primary flowpath.

Figure 3:
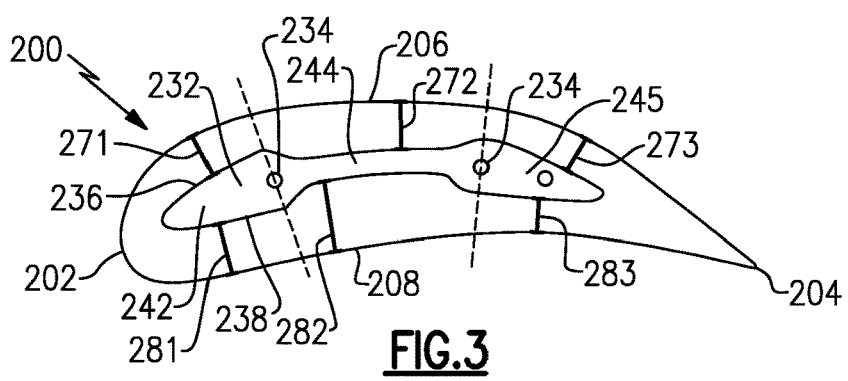
FIG. 3 schematically illustrates a tip view of a first exemplary rotor blade for utilization within a gas turbine engine.

With continued reference to the rotor blade 100 of FIG. 2, FIG. 3 schematically illustrates a radially inward looking view of a tip portion 200 of a first exemplary rotor blade. The tip portion 200 includes a leading edge 202 and a trailing edge 204. The leading edge 202 is connected to the trailing edge via a suction surface 206 and a pressure surface 208. Visible from the tip are multiple purge holes 234. A squealer pocket 232 protrudes radially into the tip, and defines a void space. In some examples, the tip portion can be thinner along a chord line than a remainder of the blade. In yet further examples, the profile at the tip can be different from the profile in a remainder of the blade.

The squealer pocket 232 includes a first side wall 236 and a second side wall 238. The first side wall 236 is adjacent to, and corresponds to, the suction surface 206. Similarly, the second side wall 238 is adjacent to, and corresponds to, the pressure surface 208. Each of the side walls 236, 238 in the illustrated example is generally oriented in alignment with the corresponding surface 206, 208. In alternative examples, the side walls can be sloped relative to the corresponding surface.

In the example of FIG. 3, the squealer pocket 232 is divided into three portions, a forward portion 242, a mid portion, 244 and an aft portion 245. The curvature of the side walls 236, 238 is generally aligned with the curvature of the corresponding surface 206, 208 of the blade. As used herein, the terms "aligned with" and "generally aligned with" refer to a curvature that is offset from, but tracks, the curvature that it is "generally aligned with" or "aligned with". In the mid portion 244 of the squealer pocket 232, the curvature of the sidewalls is not aligned with the curvature of at least one of the corresponding surfaces 206, 208. By way of example, the surfaces 206, 208 of FIG. 3 include a convex surface 206 and a concave surface 208. In contrast, both the side walls 236, 238 are concave in the mid portion 244 of the squealer pocket 232.

In the example of FIG. 3, the border between the forward portion 242 and the mid portion 244 of the squealer pocket 232 is generally at the position of a purge hole 234. Similarly, the border between the mid portion 244 and the aft portion 245 of the squealer pocket 232 is generally the position of another purge hole 234. One of skill in the art will understand that the forward, mid and aft portions 242, 244 and 245 of the squealer pocket 232 are in some examples defined by the curvature of the side walls 236, 238, and not by the specific positions of the purge holes 234. In alternate examples, the forward mid and aft portions 242, 244, 245 are defined by the positions of the purge holes 234.

In the example of FIG. 3, the suction surface 206 and the side wall 236 of the squealer pocket 232 form a set of thicknesses 271, 272, 273 with the first thickness 271 being a thickness at the fore section 242 of the squealer pocket 232, the second thickness 272 being the thickness at the mid-section 244 of the squealer pocket 232, and the third thickness 273 being the thickness at the aft section 245 of the squealer pocket 232. In the illustrated example, the first thickness 271, and the third thickness 273 are smaller than the second thickness 272.

Similarly, the pressure surface 208 and the side wall 238 of the squealer pocket 232 form a set of thicknesses 281, 282, 283 with the first thickness 281 being a thickness at the fore section 242 of the squealer pocket 232, the second thickness 282 being the thickness at the mid-section 244 of the squealer pocket 232, and the third thickness 283 being the thickness at the aft section 245 of the squealer pocket 232. In the illustrated example, the first thickness 281, and the third thickness 283 are smaller than the second thickness 282.

Figure 4:
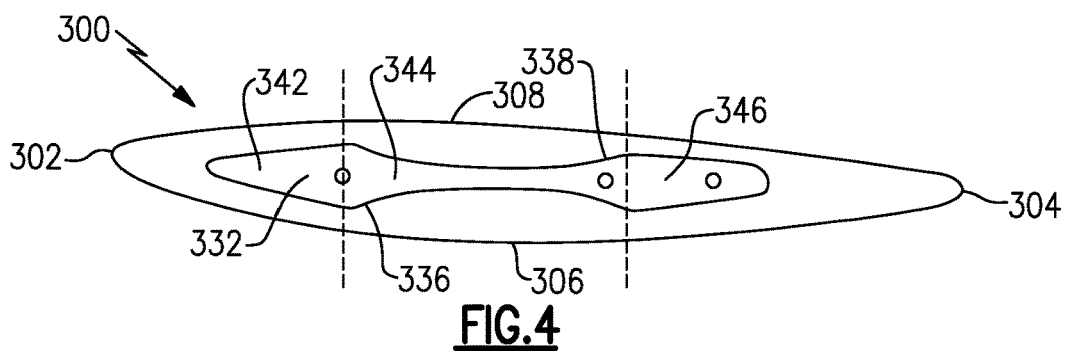
FIG. 4 schematically illustrates a tip view of a second exemplary rotor blade for utilization within a gas turbine engine.
Figure 5:
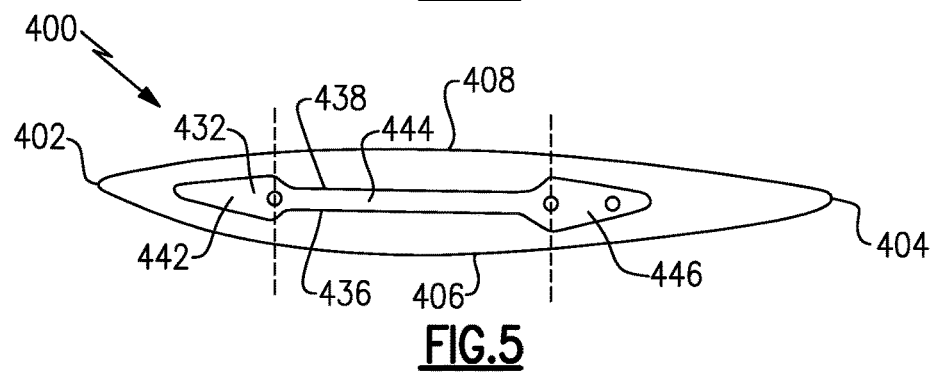
FIG. 5 schematically illustrates a tip view of a third exemplary rotor blade for utilization within a gas turbine engine.

With continued reference to FIGS. 2 and 3, and with like numerals indicating like elements, FIG. 4 schematically illustrates a second exemplary blade tip 300, including a squealer pocket 332. The blade tip 300 includes a leading edge 302 and a trailing edge 304, with the leading edge 302 being connected to the trailing edge 304 via a pressure surface 306 and a suction surface 308. Unlike the example of FIG. 3, both the pressure surface 306 and the suction surface 308 of the blade tip 300 are convex. In some examples, the blade tip 300 including two convex surfaces 306, 308, such as the illustrated tip 300 of FIG. 4, extends only a few span percentages of the blade, and the remainder of the blade includes a standard airfoil profile, such as the profile illustrated in FIG. 3.

As with the example of FIG. 3, the squealer pocket 332 includes a forward portion 342, a mid-portion 344 and an aft portion 346. The squealer pocket 332 is a radially inward protrusion into the tip portion and is defined by a side wall 336 adjacent to the pressure surface 306 and a side wall 338 adjacent to the suction surface 308. The side walls 336, 338 at the forward portion 342 of the squealer pocket 332 and the aft portion 346 of the squealer pocket 342 are generally aligned with the corresponding adjacent surface 336, 338. The side walls of the mid portion 344 of the squealer pocket is not aligned with the corresponding adjacent surface. In the illustrated example of FIG. 4, both side walls 336, 338 in the mid portion 344 are concave, while both surfaces 306, 308 of the blade tip 300 are convex.

With continued reference to FIGS. 2-4, FIG. 5 schematically illustrates a third exemplary blade tip 400 including a squealer pocket 432. The blade tip 400 includes a leading edge 402 and a trailing edge 404, with the leading edge 402 being connected to the trailing edge 404 via a pressure surface 406 and a suction surface 408. As with the example of FIG. 4, both the pressure surface 406 and the suction surface 308 of the blade tip 400 are convex. In some examples, the blade tip 400 including two convex surfaces 406, 408, extends only a few span percentages of the blade, and the remainder of the blade includes a standard airfoil profile, such as the profile illustrated in FIG. 3.

As with the examples of FIGS. 3 and 4, the squealer pocket 432 includes a forward portion 442, a mid-portion 444 and an aft portion 446. The squealer pocket 432 is a radially inward protrusion into the tip portion and is defined by a side wall 436 adjacent to the pressure surface 406 and a side wall 438 adjacent to the suction surface 408. The side walls 436, 438 at the forward portion 442 of the squealer pocket 432 and the aft portion 446 of the squealer pocket 442 are generally aligned with the corresponding adjacent surface 436, 438. The curvature of the side walls of the mid portion 444 of the squealer pocket 432 is not aligned with the curvature of the corresponding adjacent surface. In the illustrated example of FIG. 4, both side walls 436, 438 in the mid portion 444 are planar, while both surfaces 406, 408 of the blade tip 400 are convex.

With reference again to FIGS. 2-5, in some examples, the tip portions 200, 300 can be provided with a cutting coating. The cutting coating covers the exterior facing surfaces of the tip 200, 300, including the side walls of the squealer pocket 332. The cutting coating causes the tip section 200, 300 to be abrasive relative to a blade outer air seal, or other turbine engine component radially outward of the blade. The abrasiveness in turn causes the blade to remove material from the radially outward component during a rub event, rather than the radially outward component removing material from the blade. This in turn extends the life cycle of the blade, and maintains peak efficiency of the blade tip for a longer period of time.

Further, by creating a portion of the squealer pocket side wall that is not aligned with the corresponding adjacent surface, the amount of material around the tip rods during the casting process can be increased, leading to an improved manufacturability of the blade.

With reference again to FIGS. 3 and 5, FIG. 6 schematically illustrates the tip view of the first exemplary rotor blade, with the added feature of a tip shelf 290. Similarly, FIG. 7 schematically illustrates the tip view of the third exemplary rotor blade with the added feature of a tip shelf 490. The tip shelf 290, 490 is a radially inward intrusion along one edge of the blade tip 200, 400. The radially inward intrusion begins at a point downstream of the leading edge 202, 402 and upstream of a foremost position of the squealer pocket 232, 432. The radially inward intrusion extends to a trailing edge 204, 404 of the tip portion 200, 400. One of skill in the art, having the benefit of this disclosure will understand that the tip shelf 290, 490 can be included or omitted depending on the specific needs of a given rotor blade. Further, one of skill in the art will understand that the tip shelf 290, 490 is not limited to the illustrated positions. In alternative examples, the tip shelf 290, 490 can extend from the leading edge 202, 402 to the trailing edge 204, 404. In yet further alternative examples, the leading edge of the tip shelf can wrap around the leading edge 202, 402 and extend onto the opposite surface.

Figure 6:
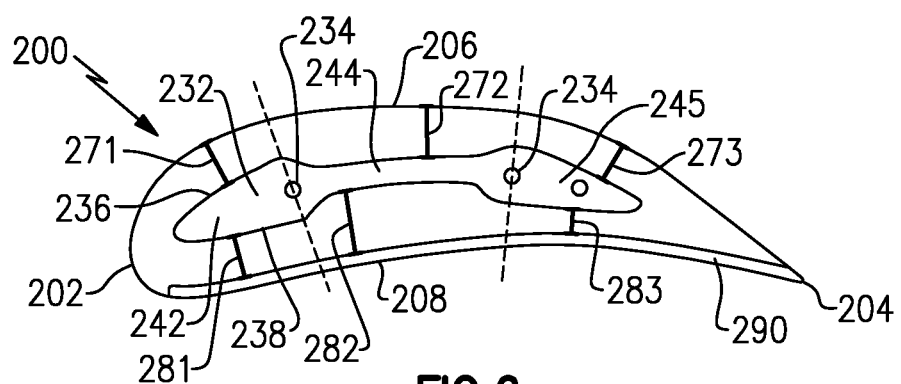
FIG. 6 schematically illustrates the tip view of the first exemplary rotor blade, with the added feature of a tip shelf.
Figure 7:
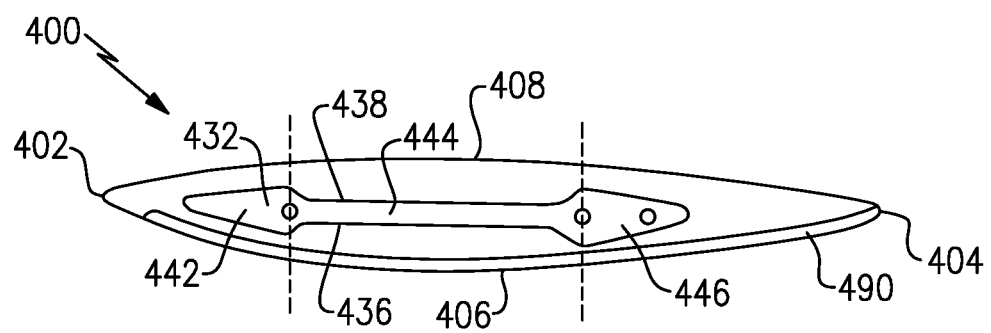
FIG. 7 schematically illustrates the tip view of the third exemplary rotor blade with the added feature of a tip shelf.

With reference now to FIGS. 3 and 6 specifically, the thicknesses 281, 282, 283 of the side walls in the example of FIG. 6 are measured from the squealer pocket 232 to an edge of the tip shelf 290, rather than to the outermost edge of the blade as in the example of FIG. 3 omitting the tip shelf 290.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine blade comprising:
a blade portion including a leading edge, a trailing edge, a first surface connecting said leading edge to said trailing edge and a second surface connecting said leading edge to said trailing edge;
a tip section at a first end of the blade portion, the tip including a pocket protruding into the tip section from an outermost end of said tip section;
the pocket having a first side wall adjacent said first surface and a second side wall adjacent said second surface, at least one of said first side wall and said second side wall having a curve distinct from a curve of the corresponding adjacent surface;
a plurality of rod holes connecting at least one internal cooling passage of the engine blade with the outermost end of the tip section, wherein each rod hole in the plurality of rod holes is offset from the first side wall and is offset from the second side wall;
the second surface is a surface of the second side wall along a length of the pocket;
the pocket includes a forward portion, a mid portion and an aft portion, at least one of the forward portion and the aft portion including sidewalls having a curve aligned with the corresponding adjacent surface;
a first wall thickness between one of said first surface and said second surface and a corresponding squealer pocket side wall at said mid section is greater than a second wall thickness between one of the first surface and the second surface and the corresponding squealer pocket side wall at the forward portion; and
wherein the corresponding side walls at said mid portion are generally straight without breaks or interruptions.

2. The gas turbine engine blade of claim 1, wherein said first surface is concave and said second surface is convex.

3. The gas turbine engine blade of claim 1, wherein said first surface at said tip portion is convex and said second surface at said tip portion is convex.

4. The gas turbine engine blade of claim 1, further including a coating at least covering said tip section, said first side wall and said second side wall.

5. The gas turbine engine blade of claim 1, wherein the forward portion and the aft portion include sidewalls having a curve aligned with the corresponding adjacent surface.

6. The gas turbine engine blade of claim 1, wherein a thickness between one of said first surface and said second surface and a corresponding squealer pocket side wall at said mid section is greater than a thickness between the one of the first surface and the second surface and the corresponding squealer pocket side wall at the aft portion.

7. The gas turbine engine blade of claim 1, wherein the blade portion, tip section and pocket are a singular cast component.

8. The gas turbine engine blade of claim 1, wherein a first side and a second side of said pocket is concave.

9. The gas turbine engine blade of claim 1, wherein the tip section further includes a tip shelf extending along one of said first surface and said second surface.

10. The gas turbine engine blade of claim 9, wherein the tip shelf is a radial inward intrusion into said tip section, and wherein the tip shelf extends from the trailing edge to a position forward of the pocket and aft of the leading edge.

11. The gas turbine engine blade of claim 9, wherein the tip shelf extends around the leading edge and into the other of said first surface and said second surface.

12. The gas turbine engine blade of claim 1, wherein said first side wall is sloped relative to said first surface and said second side wall is sloped relative to said second surface.

13. The gas turbine engine blade of claim 1, wherein a first rod hole is disposed at a boundary between the forward portion and the mid portion and a second rod hole is disposed at a boundary between the mid portion and the aft portion.

14. The gas turbine engine of claim 1, wherein the pocket includes a fully closed perimeter.

15. A gas turbine engine comprising:
a compressor section,
a combustor fluidly connected to the compressor section;
a turbine section fluidly connected to the combustor; and
a plurality of rotors disposed in at least one of said compressor section and said turbine section, each of said rotors having
a blade portion including a leading edge, a trailing edge, a first surface connecting said leading edge to said trailing edge and a second surface connecting said leading edge to said trailing edge;
a tip section at a first end of the blade portion, the tip including a pocket protruding into the tip section from an outermost end of said tip section;
the pocket having a first side wall adjacent said first surface and a second side wall adjacent said second surface, at least one of said first side wall and said second side wall having a curve distinct from a curve of the corresponding adjacent surface, a plurality of rod holes connecting at least one internal cooling passage of the engine blade with the outermost end of the tip section, wherein each rod hole in the plurality of rod holes is offset from the first side wall and is offset from the second side wall;
the second surface is a surface of the second side wall along a length of the pocket; and
the pocket includes a forward portion, a mid portion and an aft portion, at least one of the forward portion and the aft portion including sidewalls having a curve aligned with the corresponding adjacent surface;
a first wall thickness between one of said first surface and said second surface and a corresponding squealer pocket side wall at said mid section is greater than a second wall thickness between one of the first surface and the second surface and the corresponding squealer pocket side wall at the forward portion; and
wherein the corresponding side walls at said mid portion are generally straight without breaks or interruptions.

* * * * *